F. ARNOLD.
Vegetable Cutter.
No. 58,570.  Patented Oct. 9, 1866.
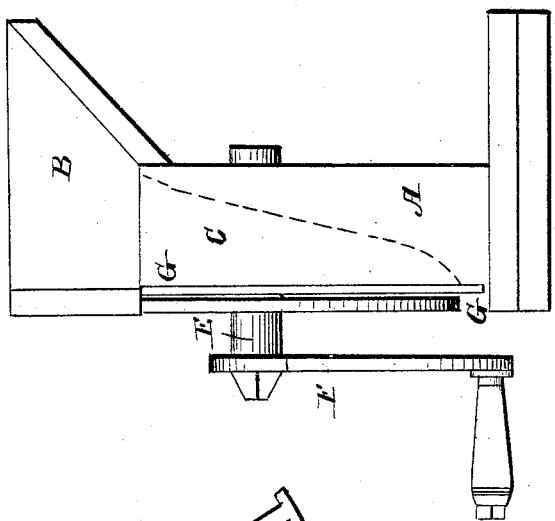
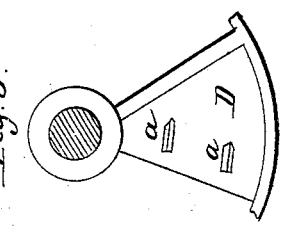
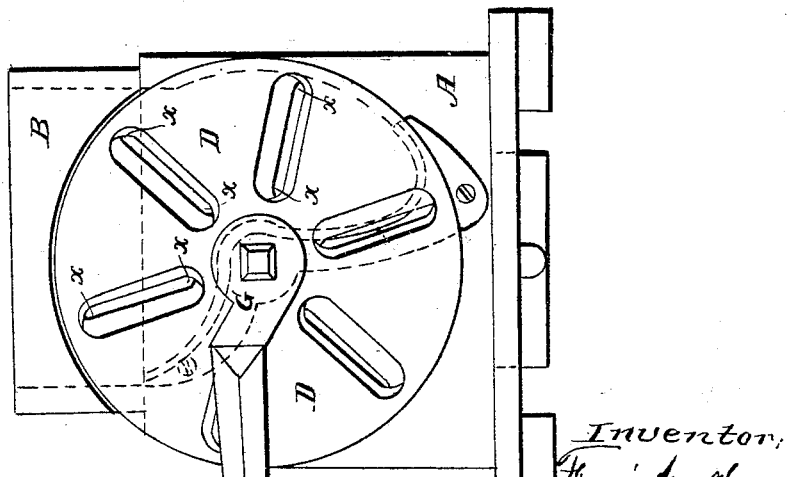

UNITED STATES PATENT OFFICE.

FRANCIS ARNOLD, OF HADDAM NECK, CONNECTICUT.

IMPROVED VEGETABLE-CUTTER.

Specification forming part of Letters Patent No. 58,570, dated October 9, 1866.

*To all whom it may concern:*

Be it known that I, FRANCIS ARNOLD, of Haddam Neck, in the county of Middlesex and State of Connecticut, have invented certain new and useful Improvements in Vegetable and Root Cutters; and I do hereby declare that the following is a full, clear, and exact description of the same, reference being had to the accompanying drawings, and to the letters of reference marked thereon.

In the annexed drawings, making part of this specification, A represents the frame of the machine, which rests or sits upon a proper base of any ordinary construction. This frame consists of a block of wood which has formed in one side of it an opening, C, which said opening is made large enough at top to receive the vegetables to be cut, gradually diminishing in size (as seen, Fig. 3) to its bottom. This frame is provided with a hopper, B, which sits over its top and opening C. To the frame A, and skirting the opening C, in the manner shown in red lines, Fig. 1, is a metallic plate, G, said plate being firmly secured to the frame or block.

E represents a metallic shaft, which runs through and has its bearings in the frame A. Cast or secured upon this shaft is a wheel, D. This wheel has a series of slots or openings cast or cut in it, as seen, from *x* to *x*. The metal on one side of each of these openings is beveled off, so that it forms a knife for cutting vegetables and roots which are placed in the machine. The edges of the metal skirting the slot cut in the wheel, upon which the cutting-edges or knives are formed, are cast so as to project a little beyond the actual face of the wheel, and at an angle to said face, so that in rotating the wheel the edges of the knives will come first in contact with the vegetable or root to be cut. The wheel may be cast alike upon both sides, so that when one side is worn the other may be used by reversing the wheel.

The vegetables to be cut are placed in the opening C, and, being held against the wheel D by the back of the opening C, are cut or sliced by the knives of the wheel as they rotate with said wheel. As a slice is cut from the vegetable or root it falls still lower in the opening, and is again and again cut or sliced until it is all cut to pieces. The pieces of vegetable cut off pass from the machine through the openings above described in the wheel. A crank, F, upon shaft E causes the wheel D to revolve, thus bringing the knives successively in contact with the vegetables.

*a a* represent lugs or spurs formed or cast upon the inner face of the wheel D, which serve to hold the vegetables while being cut.

The crank F may be fitted on either end of the shaft E, according to which way it is intended to run the wheel D.

Having thus fully described my invention, what I claim as new, and desire to secure by Letters Patent, is—

The wheel D, with knives cast upon one of its faces and with openings through which the pieces of vegetables and roots pass, when said wheel is used with a frame constructed substantially as herein set forth, and for the purposes described.

As evidence that I claim the foregoing I have hereunto set my hand in the presence of two witnesses.

FRANCIS ARNOLD.

Witnesses:
LEONARD WILLEY,
JOSIAH ACKLEY.